UNITED STATES PATENT OFFICE.

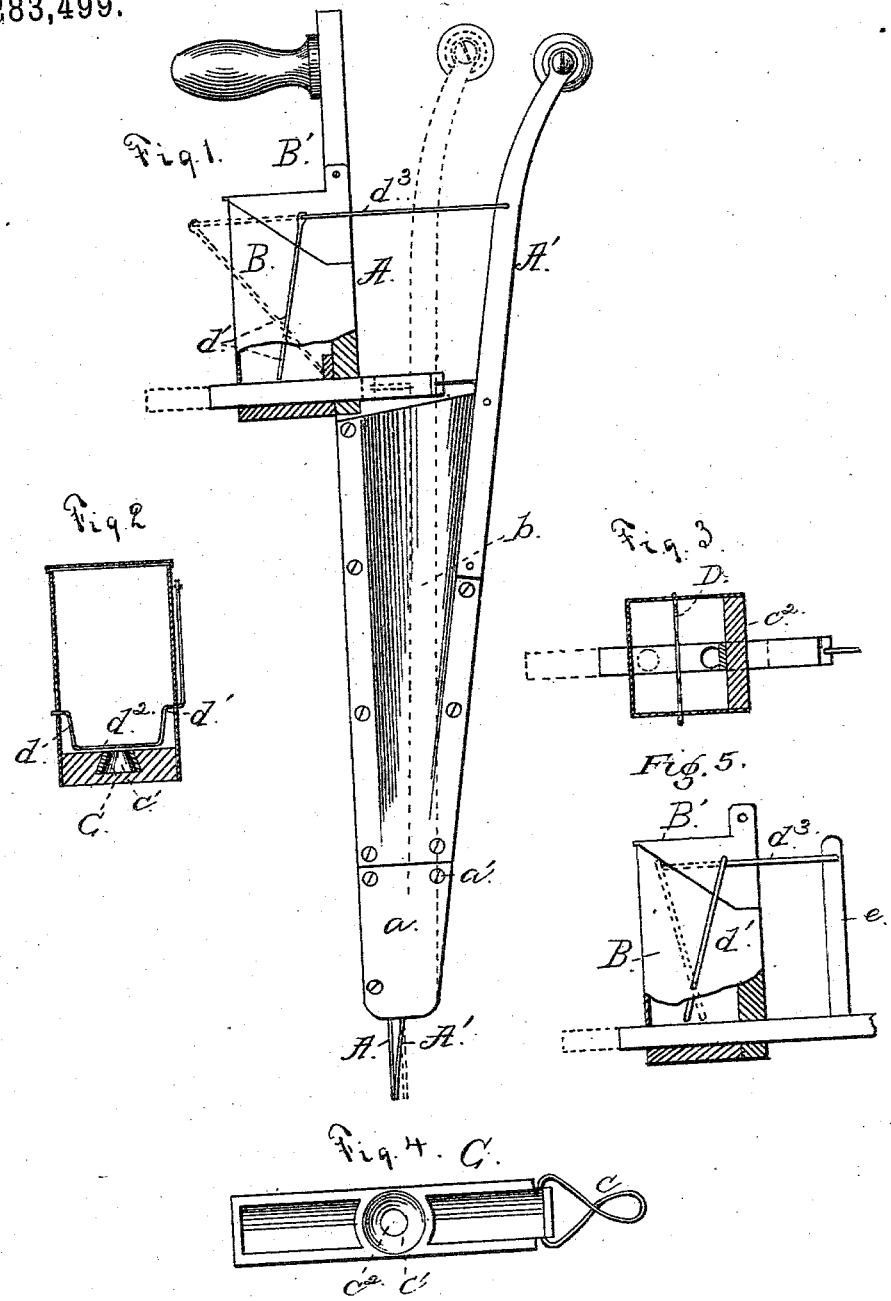

ADAM LYNN, OF PATASKALA, OHIO.

HAND-PLANTER.

SPECIFICATION forming part of Letters Patent No. 283,499, dated August 21, 1883.

Application filed May 10, 1883. (No model.)

*To all whom it may concern:*

Be it known that I, ADAM LYNN, a citizen of the United States, residing at Pataskala, in the county of Licking and State of Ohio, have invented certain new and useful Improvements in Hand-Planters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in seed-planters; and it consists in the construction, combination, and arrangement of the several parts, as will be hereinafter fully described, and pointed out in the claims.

In the drawings, Figure 1 is a side view of a hand-planter constructed according to my invention. Fig. 2 is a detached sectional view of the grain-box. Fig. 3 is a cross-sectional view of the grain-box. Fig. 4 is a detail view of the under side of the dropping-slide, and Fig. 5 shows a modification, all of which will be described.

The handles A A' are pivotally connected near their lower ends through the medium of the side plates, $a$, which are made fast to the handle A, and are pivotally secured to the handle A' by means of screw $a'$, as shown. This screw $a'$ is arranged near the upper end of the plate, as shown, and above the said plate the handles are connected by the flexible side pieces, $b$, which form the grain-chute, as will be readily understood.

On the outer side of the handle A, near its upper end, I secure the grain-box B, having a suitable lid, B', and having openings leading through the handle A into the chute formed by the side pieces, $b$, and also through the outer side of the seed-box. The dropping-slide C works through these openings, its under side moving against the bottom of the grain-box, and it is connected by the link $c$ with the handle A', and receives from the said handle the reciprocating motion necessary to the operation of the device. The said dropping-slide is provided with the receptacle $c'$, made in the shape of a truncated cone, and communicating through the opening $c^2$ with the grain-box. This slide is so arranged that the receptacle $c'$ works alternately within the seed-box and the chute and delivers the desired number of kernels with each operation of the handles.

In the planting of corn and other seeds by a dropping-slide working into and out of a grain-box, difficulty is experienced in obtaining regularity in the number of kernels dropped, as sometimes the opening into the receptacle of the slide will become clogged and prevent the said receptacle from being filled by the seed being planted. To obviate this difficulty I have provided the stirrer-bail D, having its side bars, $d\,d'$, pivoted in the side of the seed-box, the latter bar being extended up to near the top of the box and connected with the operating mechanism, as will be described. The cross-bar $d^2$ of this bail-stirrer, it will be seen, is arranged at right angles to the dropping-slide C, and it is swung and moves close to the said slide and in line therewith, as shown in Figs. 1 and 2.

The upper end of the bar $d'$ is connected by link $d^3$ with the handle A', and the stirrer is thereby operated simultaneously with the grain-slide. The action of the bail, it will be seen, is to agitate the kernels or grains above the opening $c^2$ as the slide is moved and prevent any clogging or closing of the said opening, and secures an easy action of the slide and insures the proper number of grains being dropped. I do not desire to be limited to the application of my bail-stirrer to hand-planters, as it will be understood that it is equally applicable to other classes of seeding-machines.

In Fig. 5 I have shown a section of a dropping-slide of a seeding-machine and a seed-box. I have not thought it necessary to show either the supporting mechanism or that for operating the grain-slide, as any of the well-known means could be employed. On the slide I have mounted a standard, $e$, to which the link $d^3$ is connected, and the bail-stirrer is simultaneously operated with the dropping-slide, as will be understood on reference to the drawings.

Having thus described my invention, what I claim, and desire to secure by Letters Patent, is—

1. In a seeding-machine, the combination, substantially as hereinbefore set forth, of the grain-box, an oscillating bail-stirrer pivoted within the grain-box and swinging to and fro over the seed-cup, the grain-dropping slide placed in the bottom of the grain-box and sliding reciprocally with the bail-stirrer, and means whereby the said stirrer and grain-slide are given a simultaneous reciprocating movement, as described.

2. In a hand corn-planter, the combination, substantially as described and shown, of handles A A', grain-box B, bail-stirrer D, pivoted in the sides of and working within the grain-box, and having one of its side bars extended above its pivotal point, and link $d^3$, connecting the extended end of the bail side bar and the handle A', substantially as specified.

In testimony whereof I affix my signature in presence of two witnesses.

ADAM LYNN.

Witnesses:
WARREN CARGILL,
HORTON HOWARD.